United States Patent
Okamoto et al.

(10) Patent No.: US 9,692,068 B2
(45) Date of Patent: Jun. 27, 2017

(54) FUEL CELL SYSTEM

(71) Applicant: TOYOTA JIDOSHA KABUSHIKI KAISHA, Toyota-shi, Aichi-ken (JP)

(72) Inventors: Yohei Okamoto, Toyota (JP); Yutaka Tano, Toyota (JP); Mitsuhiro Nada, Toyota (JP); Tomohiko Kaneko, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/936,961

(22) Filed: Nov. 10, 2015

(65) Prior Publication Data

US 2016/0141691 A1    May 19, 2016

(30) Foreign Application Priority Data

Nov. 14, 2014    (JP) .................................. 2014-232237

(51) Int. Cl.
 *H01M 8/04* (2016.01)
 *H01M 8/04992* (2016.01)
 (Continued)

(52) U.S. Cl.
 CPC ..... *H01M 8/04992* (2013.01); *H01M 8/0488* (2013.01); *H01M 8/04358* (2013.01);
 (Continued)

(58) Field of Classification Search
 None
 See application file for complete search history.

(56) References Cited

U.S. PATENT DOCUMENTS

| 2006/0234092 A1 | 10/2006 | Thompson et al. |
| 2008/0299428 A1 | 12/2008 | Miyata et al. |
| 2010/0068576 A1 | 3/2010 | Hamada et al. |

FOREIGN PATENT DOCUMENTS

| JP | 2008-300299 | 12/2008 |
| JP | 2009-158397 | 7/2009 |
| WO | WO 2008/146928 A1 | 12/2008 |

*Primary Examiner* — Patrick Ryan
*Assistant Examiner* — Wyatt McConnell
(74) *Attorney, Agent, or Firm* — Finnegan, Henderson, Farabow, Garrett & Dunner, LLP

(57) ABSTRACT

A fuel cell system includes: a fuel cell; a coolant path connected to the fuel cell and allowing a coolant that cools the fuel cell to flow therethrough; a temperature detection unit configured to detect a temperature of the coolant in the coolant path; a temperature correction unit configured to calculate a temperature correction value by correcting the temperature of the coolant detected by the temperature detection unit; and a lower limit voltage control unit configured to control a lower limit voltage of the fuel cell based on the temperature correction value, wherein the temperature correction unit calculates the temperature correction value based on a following equation:

$$T_{filt} = T_{filt\_old} + \frac{T - T_{filt\_old}}{\tau}$$

where $T_{filt}$ represents the temperature correction value, $T_{filt\_old}$ represents a last temperature correction value, T represents the temperature of the coolant, and $\tau$ represents a coefficient, and the coefficient when the temperature of the coolant is less than a first predetermined value is set to be greater than the coefficient when the temperature of the coolant is equal to or greater than a second predetermined value.

1 Claim, 3 Drawing Sheets

(51) Int. Cl.
*H01M 8/0432* (2016.01)
*H01M 8/04858* (2016.01)
H01M 8/04029 (2016.01)

(52) U.S. Cl.
CPC .... *H01M 8/04029* (2013.01); *H01M 2250/20* (2013.01); *Y02T 90/32* (2013.01)

FUEL CELL SYSTEM

CROSS-REFERENCE TO RELATED APPLICATION

This application is based upon and claims the benefit of priority of the prior Japanese Patent Application No. 2014-232237, filed on Nov. 14, 2014, the entire contents of which are incorporated herein by reference.

FIELD OF THE INVENTION

The present invention relates to a fuel cell system.

BACKGROUND

A fuel cell generates electric power by a chemical reaction between hydrogen as fuel and air containing oxygen as oxidant. The fuel cell generates heat with the generation of electric power. When the temperature of the fuel cell rises outside a predetermined temperature range, water evaporates and a dry state occurs, and the power generation performance degrades thereby. Thus, to prevent the overheating of the fuel cell, the control that increases a lower limit voltage with the increase in the temperature of the coolant of the fuel cell to reduce heat generation may be performed. When the lower limit voltage is increased, the output is easily limited because of the characteristics of the fuel cell. There has been various suggestions on the setting of the lower limit voltage as disclosed in, for example, International Publication No, 2008/146928, and Japanese Patent Application Publication Nos. 2009-158397 and 2008-300299.

SUMMARY OF THE INVENTION

It is an object of the present invention to provide a fuel cell system having a good output response.

According to an aspect of the present invention, there is provided a fuel cell system including: a fuel cell; a coolant path connected to the fuel cell and allowing a coolant that cools the fuel cell to flow therethrough; a temperature detection unit configured to detect a temperature of the coolant in the coolant path; a temperature correction unit configured to calculate a temperature correction value by correcting the temperature of the coolant detected by the temperature detection unit; and a lower limit voltage control unit configured to control a lower limit voltage of the fuel cell based on the temperature correction value, wherein the temperature correction unit calculates the temperature correction value based on a following equation:

$$T_{filt} = T_{filt\_old} + \frac{T - T_{filt\_old}}{\tau}$$

where $T_{filt}$ represents the temperature correction value, $T_{filt\_old}$ represents a last temperature correction value, T represents the temperature of the coolant, and $\tau$ represents a coefficient, and the coefficient when the temperature of the coolant is less than a first predetermined value is set to be greater than the coefficient when the temperature of the coolant is equal to or greater than a second predetermined value.

DETAILED DESCRIPTION

When the lower limit voltage is changed based on the temperature of the coolant of a fuel cell, the following inconvenience may occur. For example, when the temperature of the fuel cell instantly rises as a WOT (Wide Open Throttle), a temporal temperature rise may be detected. More specific description will be given as follows. The temperature of the fuel cell is typically estimated by detecting the temperature of the coolant. When the temperature of the fuel cell rises and a predetermined rise in temperature of the coolant is detected, the supply of the coolant is increased or the coolant cooled by passing through the radiator is supplied to cool the fuel cell. However, it takes a certain amount of time for the cooled coolant to reach a temperature detection unit that detects the temperature of the coolant. As a result, the temperature detection unit may detect a rise in temperature of the coolant. The control to increase the lower limit voltage may be carried out based on this rise in temperature, and the output may be limited. As described above, when the changing of the lower limit voltage is controlled simply based on the temperature of the coolant is carried out, the output is excessively limited, and a good output response may not be obtained.

A description will be given of an embodiment of the present invention with reference to the accompanying drawings.

First Embodiment

Figure 1A:
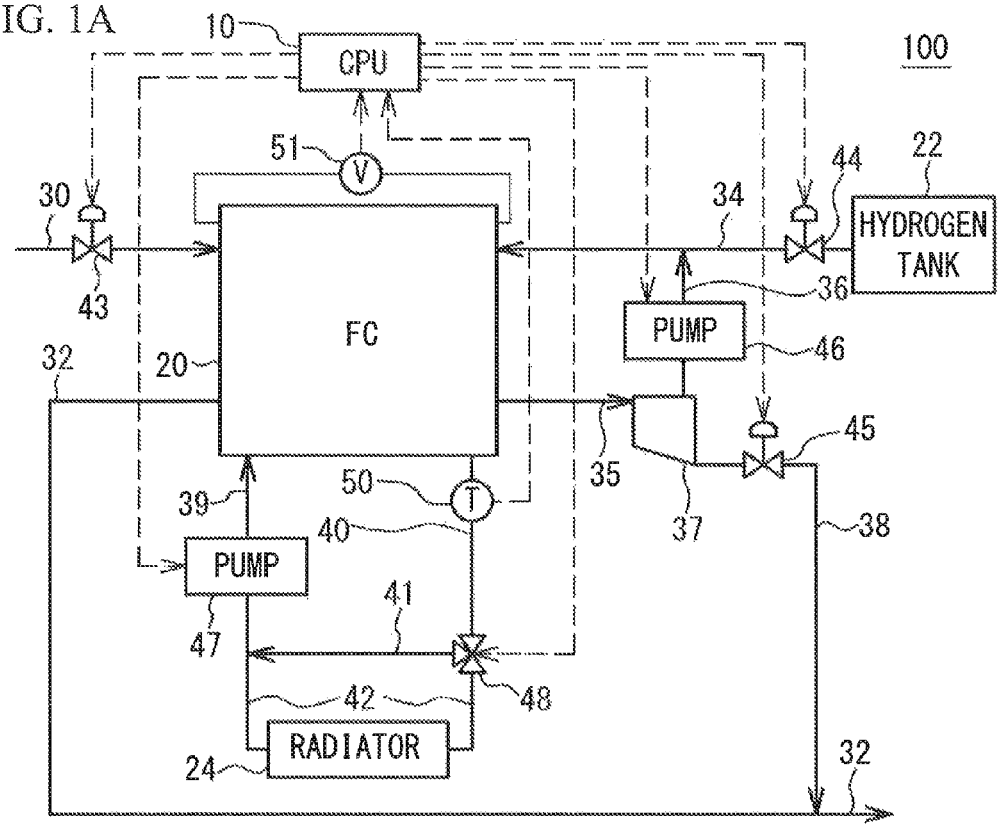
FIG. 1A is a block diagram illustrating a fuel cell system in accordance with a first embodiment.

FIG. 1A is a block diagram illustrating a fuel cell system 100 in accordance with a first embodiment. The fuel cell system 100 is installed in fuel cell vehicles, electric vehicles, or the like as a system supplying a driving power source for driving wheels of the vehicle. As illustrated in FIG. 1A, the fuel cell system 100 includes a CPU (Central Processing Unit) 10, a fuel cell (FC) 20, a hydrogen tank 22, and a radiator 24. The CPU 10 is an example of a control unit. The radiator 24 is an example of a cooling unit.

The fuel cell 20 connects to an air supply conduit 30, an air exhaust conduit 32, a fuel gas supply conduit 34, and a fuel gas exhaust conduit 35. A fuel gas circulation conduit 36 is connected between the fuel gas supply conduit 34 and the fuel gas exhaust conduit 35. A gas-liquid separator 37 is disposed in the fuel gas circulation conduit 36. The fuel gas supply conduit 34, the fuel gas exhaust conduit 35, and the fuel gas circulation conduit 36 form a fuel gas path that allows hydrogen gas, which is a fuel gas, to circulate therethrough.

A valve 43 is disposed in the air supply conduit 30, and a valve 44 is disposed in the fuel gas supply conduit 34. In addition, a valve 45 is disposed in an external exhaust conduit 38. The valve 43 controls the flow rate of air. The valve 44 controls the flow rate of a fuel gas. The valve 45 is a valve for discharging a part of a fuel off-gas that has once passed through the fuel cell 20 and impurities from the fuel gas path to the outside. When the valve 45 opens, a part of the fuel off-gas and impurities flow from the fuel gas path to the external exhaust conduit 38 and are discharged into the outside.

In addition, the fuel cell 20 connects to a coolant supply conduit 39 and a coolant exhaust conduit 40. Each of coolant circulation conduits 41 and 42 is connected between the coolant supply conduit 39 and the coolant exhaust conduit 40. The coolant supply conduit 39, the coolant exhaust conduit 40, and the coolant circulation conduits 41 and 42 form a coolant path. A three-way valve 48 is disposed in the coolant exhaust conduit 40. A first outlet of the three-way valve 48 connects to the coolant circulation conduit 41, and a second outlet connects to the coolant circulation conduit 42. The radiator 24 is disposed in the coolant circulation conduit 42.

A pump 46 is disposed in the fuel gas circulation conduit 36. A pump 47 is disposed in the coolant supply conduit 39. The pumps 46 and 47 are, for example, Roots pumps, screw pumps, or turbopumps.

Air is supplied from the atmosphere to the air side electrode (oxidant electrode) of the fuel cell 20 through the air supply conduit 30. Hydrogen gas is reserved in the hydrogen tank 22 and supplied to the hydrogen side electrode (fuel electrode) of the fuel cell 20 through the fuel gas supply conduit 34. The fuel cell 20 generates electric power by using hydrogen gas as a fuel gas and air containing oxygen as oxidant. The generated electric power is used in devices such as a motor for running the vehicle, illumination lumps, an air conditioner, and an audio device. A voltmeter 51 detects the voltage of electric power generated by the fuel cell 20 (power generation voltage).

The air after the reaction in the fuel cell 20 is discharged to the outside through the air exhaust conduit 32. The hydrogen gas that has not been used in the reaction is discharged from the fuel gas exhaust conduit 35, circulates through the fuel gas supply conduit 34 via the fuel gas circulation conduit 36, and is supplied again to the fuel cell 20.

Cooling water (coolant) is supplied to the fuel cell 20 through the coolant supply conduit 39, and cools the fuel cell 20. The cooling water that has been used for cooling is discharged to the coolant exhaust conduit 40. The cooling water flows through one of or both of the coolant circulation conduits 41 and 42, and is supplied again to the coolant supply conduit 39 and the fuel cell 20. The cooling water flowing through the coolant circulation conduit 42 is cooled in the radiator 24. The flow path of the cooling water can be changed by changing the open/close state of the three-way valve 48. For example, when the cooling water is high in temperature, the coolant exhaust conduit 40 is connected to the coolant circulation conduit 42 to cool the cooling water by the radiator 24.

A temperature sensor 50 is an example of a temperature detection unit, and is, for example, a thermistor. The temperature sensor 50 is located further upstream than the radiator 24 in the coolant exhaust conduit 40, i.e., in the vicinity of the outlet from the fuel cell 20. The temperature sensor 50 detects the temperature (water temperature) of the cooling water that has cooled the fuel cell 20. The water temperature correlates with the temperature of the fuel cell 20. Thus, the water temperature is low when the fuel cell 20 is low in temperature, while the water temperature is high when the fuel cell 20 is high in temperature.

Figure 1B:
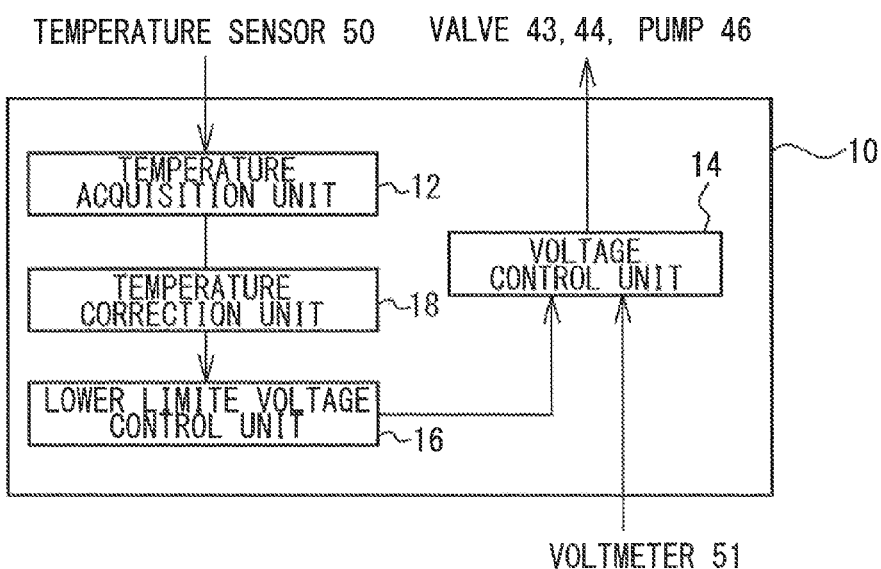
FIG. 1B is a functional block diagram illustrating a configuration of a control unit.

FIG. 1B is a functional block diagram illustrating a configuration of the CPU 10. As illustrated in FIG. 1B, the CPU 10 functions as a temperature acquisition unit 12, a voltage control unit 14, a lower limit voltage control unit 16, and a temperature correction unit 18.

The temperature acquisition unit 12 acquires water temperature detected by the temperature sensor 50. The voltage control unit 14 acquires power generation voltage of the fuel cell 20 from the voltmeter 51, and then controls the power generation voltage so that the power generation voltage is greater than the lower limit voltage. For example, the voltage control unit 14 changes the opening degree of the valve 43 to adjust the flow rate of air into the fuel cell 20, and changes a rotation speed of the pump 46, the opening degree of the valve 44, and the like to adjust the flow rate of hydrogen gas into the fuel cell 20. The voltage control unit 14 controls the power generation voltage by the above described adjustment.

The lower limit voltage control unit 16 controls a lower limit voltage $V_{ll}$ that is a lower limit of the power generation voltage in accordance with the water temperature. The lower limit voltage $V_{ll}$ is a function of a temperature correction value $T_{filt}$. The temperature correction value $T_{filt}$ is a value calculated from the water temperature, and is a parameter for setting the lower limit voltage $V_{ll}$.

The temperature correction unit 18 calculates the temperature correction value $T_{filt}$ based on the following equation. $T_{filt}$ in the equation is a temperature correction value, and $T_{filt\_old}$ is a temperature correction value calculated at a predetermined time prior to the time at which $T_{filt}$ is calculated (last temperature correction value). T represents water temperature, and τ is a time constant (coefficient) for calculating the temperature correction value $T_{filt}$.

$$T_{filt} = T_{filt\_old} + \frac{T - T_{filt\_old}}{\tau} \qquad \text{Formula 1}$$

As exhibited in Formula 1, the temperature correction value $T_{filt}$ is obtained by adding the value obtained by dividing the difference between the water temperature T and the last calculated value $T_{filt\_old}$ by the time constant τ to $T_{filt\_old}$. The above described filtering process reduces the component of rapid change in the water temperature T, enabling to obtain the stable temperature correction value $T_{filt}$. As the time constant τ decreases, the degree of change (the rate of change) in the temperature correction value $T_{filt}$ increases. As τ increases, the rate of change in the temperature correction value $T_{filt}$ decreases.

Figure 2A:
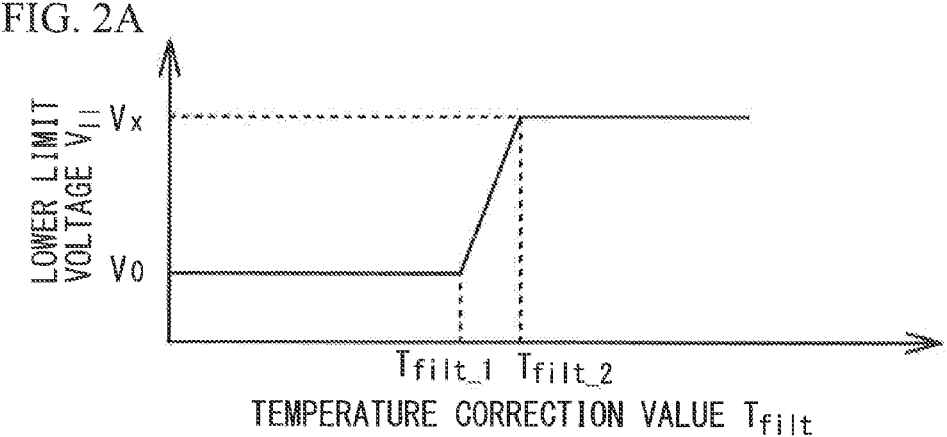
FIG. 2A is a diagram illustrating a relationship between a lower limit voltage and a temperature correction value.

FIG. 2A is a diagram illustrating a relationship between the lower limit voltage $V_{ll}$ and the temperature correction value $T_{filt}$. The horizontal axis represents the temperature correction value $T_{filt}$, and the vertical axis represents the lower limit voltage $V_{ll}$. As exhibited in FIG. 2A, when the temperature correction value $T_{filt}$ is less than $T_{filt\_1}$ (e.g., 65° C.), the lower limit voltage takes the minimum value of $V_0$. On the other hand, when the temperature correction value $T_{filt}$ is greater than $T_{filt\_1}$, the lower limit voltage is greater than $V_0$. In addition, when the temperature correction value $T_{filt}$ is equal to or greater than $T_{filt\_2}$ (e.g., 85° C.), the lower limit voltage takes the maximum value of $V_x$. As described above, the lower limit voltage $V_{ll}$ changes depending on the temperature correction value $T_{filt}$. As described previously, as the time constant τ decreases, the rate of change in the temperature correction value $T_{filt}$ increases, and as the rate of change in the temperature correction value $T_{filt}$ increases, the rate of change in the lower limit voltage $V_{ll}$ increases. That is to say, as the time constant τ decreases, the rate of change in the lower limit voltage $V_{ll}$ increases. In contrast, as τ increases, the rate of change in the temperature correction value $T_{filt}$ decreases, and the rate of change of $V_{ll}$ also decreases.

Figure 2B:
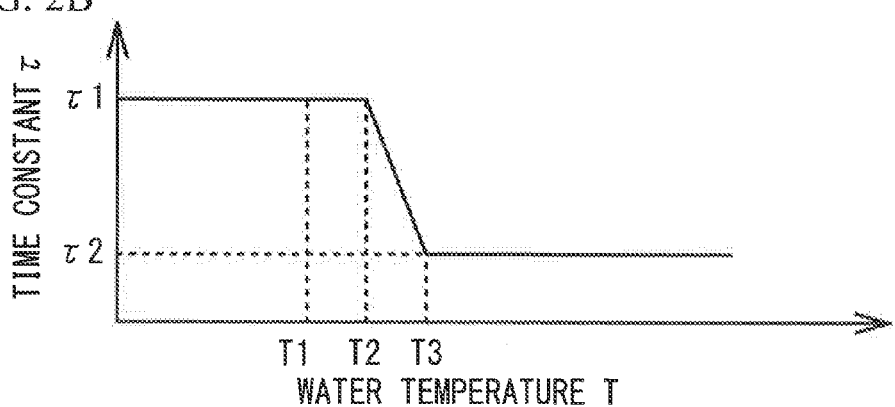
FIG. 2B is a diagram illustrating a change in time constant with respect to temperature.

FIG. 2B is a diagram illustrating a change in the time constant with respect to temperature. In FIG. 2B, the horizontal axis represents the water temperature T, and the vertical axis represents the time constant τ. As exhibited in FIG. 2B, the time constant τ changes in accordance with the water temperature T. When the water temperature T is less than T2 (e.g., 70° C.), the time constant τ is τ1 (e.g., 10 seconds). When the water temperature T is equal to or greater than T3 (e.g., 75° C.), the time constant τ is τ2 (e.g., 1 second) that is less than τ1. T1 is, for example, 65° C., and is less than T2 and T3.

Figure 2C:
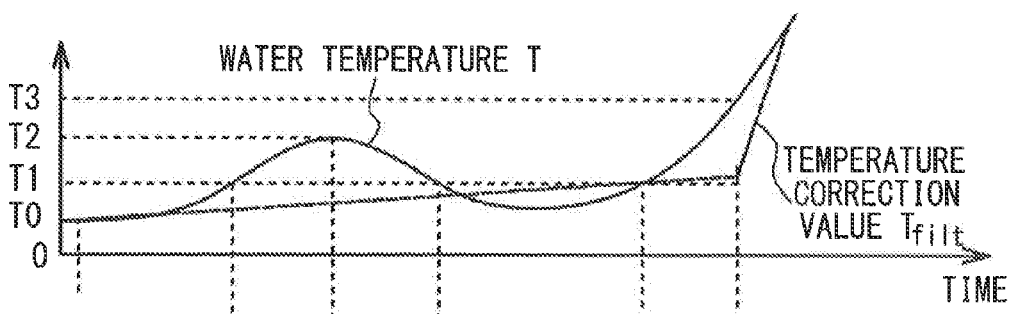
FIG. 2C is a diagram illustrating changes in water temperature and temperature correction value with respect to time.
Figure 2D:
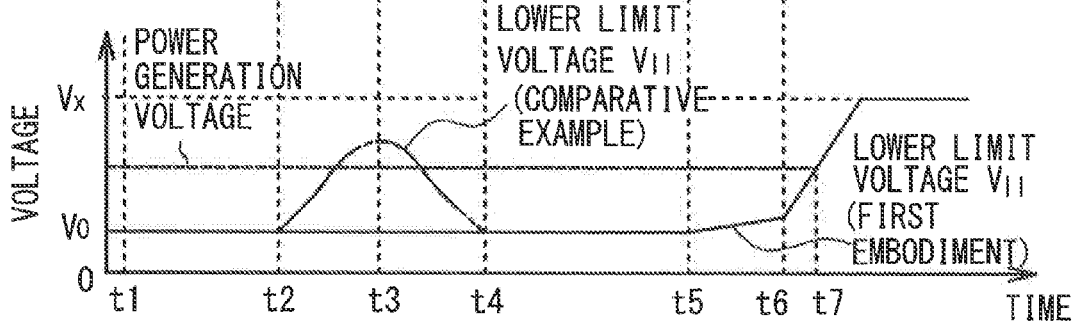
FIG. 2D is a diagram illustrating a change in voltage with respect to time.

FIG. 2C is a diagram illustrating a change in the water temperature and the temperature correction value with respect to time. FIG. 2D is a diagram illustrating a change in voltage with respect to time. In FIG. 2C and FIG. 2D, the horizontal axis represents time. In FIG. 2C, the vertical axis represents the water temperature T and the temperature correction value $T_{filt}$. Additionally, the solid line indicates the water temperature T, and the dashed line indicates the temperature correction value $T_{filt}$. In FIG. 2D, the vertical axis represents voltage, the solid line indicates the lower limit voltage $V_{ll}$ in the first embodiment, and the dashed line indicates power generation voltage. The chain line indicates a lower limit voltage when τ is not changed (τ is fixed at, for example, τ2 described later) as a comparative example.

Assume that a driver steps on the accelerator of a vehicle (an accelerator is shifted to on) at time t1 illustrated in FIG. 2C. As the fuel cell 20 generates heat, the water temperature T of the cooling water starts rising. At this time, the lower limit voltage $V_{ll}$ takes the minimum value of $V_0$, and the temperature correction value $T_{filt}$ is T0 (T0 is a measured value of the water temperature T at time t1). At time t2, the water temperature T becomes T1 (first temperature, e.g., 65° C.). At time t3, the water temperature T reaches approximately T2, then decreases, and is less than T1 at time t4. At this time, the time constant τ of Formula 1 is τ1 illustrated in FIG. 2B. Since the time constant τ is large, the rate of change in the temperature correction value $T_{filt}$ is small. More specifically, as exhibited in FIG. 2C, the temperature correction value $T_{filt}$ gently rises, but is less than $T_{filt\_1}$ (e.g., 65° C.) in FIG. 2A. Thus, as illustrated in FIG. 2D, the lower limit voltage $V_{ll}$ takes the minimum value of $V_0$ between time t2 and time t4.

As exhibited in FIG. 2C, as time passes, the water temperature T rises again, and is equal to or greater than T1 at time t5. At this time, the temperature correction value $T_{filt}$ is equal to or greater than $T_{filt\_1}$ in FIG. 2A. Thus, as illustrated in FIG. 2D, the lower limit voltage $V_{ll}$ is greater than the minimum value $V_0$. At time t6, the water temperature T is equal to or greater than T3 (second temperature, e.g., 75° C.). At this time, the time constant τ is τ2 illustrated in FIG. 2B. Since τ is τ2 that is less than τ1, the temperature correction value $T_{filt}$ rapidly increases and comes close to the water temperature T (see FIG. 2C). Since the temperature correction value $T_{filt}$ rapidly increases, the rate of change in the lower limit voltage $V_{ll}$ also increases as exhibited in FIG. 2A. The power generation voltage is approximately-constant from time t1 to t6, becomes almost the same as the lower limit voltage $V_{ll}$ after time t7, and increases with the increase in $V_{ll}$. When the temperature correction value $T_{filt}$ becomes equal to or greater than $T_{filt\_2}$ in FIG. 2A, the lower limit voltage $V_{ll}$ reaches the maximum value of $V_x$, and remains at the maximum value $V_x$ thereafter.

In contrast, in the comparative example indicated by the chain line in NG. 2D, the lower limit voltage $V_{ll}$ temporarily rises from time t2 to t4. The comparative example does not calculate the temperature correction value based on the time constant τ, and controls the lower limit voltage $V_{ll}$ based on the water temperature T, or controls the lower limit voltage $V_{ll}$ based on a time constant that is small such as τ2 (e.g., 1 second) and constant. Thus, in the comparative example, the lower limit voltage $V_{ll}$ greatly varies. That is to say, the lower limit voltage $V_{ll}$ increases with temporal rise of the water temperature T illustrated in FIG. 2C (time t2~t4). In the comparative example, as the lower limit voltage $V_{ll}$ increases, the power generation voltage increases. Thus, the output current decreases.

Figure 3:
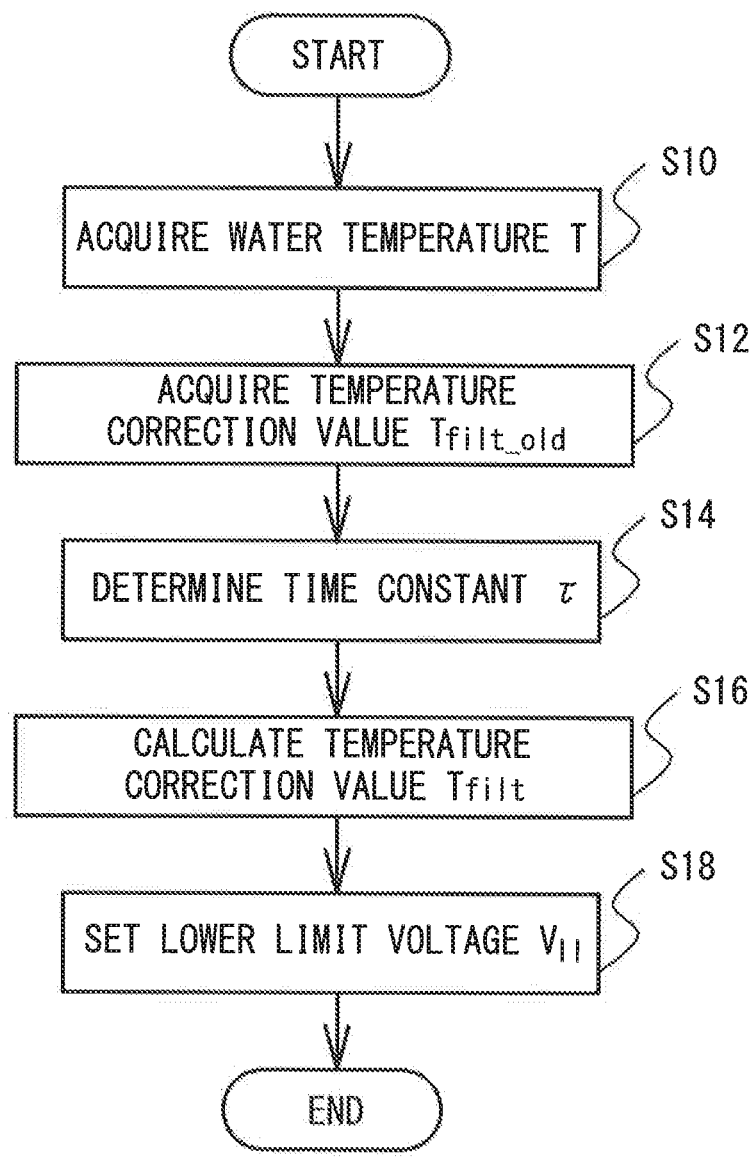
FIG. 3 is a flowchart of a process of the fuel cell system.

FIG. 3 is a flowchart of a process of the fuel cell system 100. The process of FIG. 3 is executed, for example, when a driver drives a vehicle to which the fuel cell system 100 is installed at WOT. As illustrated in FIG. 3, the temperature acquisition unit 12 acquires the water temperature T detected by the temperature sensor 50 (step S10).

The temperature correction unit 18 then acquires the last temperature correction value $T_{filt\_old}$ (step S12). The history of the temperature correction value is stored in, for example, a storing unit (a memory such as a ROM or a RAM) not illustrated.

The temperature correction unit 18 acquires the time constant τ corresponding to the water temperature T based on a map illustrated in FIG. 2B or the like (step S14).

The temperature correction unit 18 then calculates the temperature correction value $T_{filt}$ with above Formula 1 (step S16).

The lower limit voltage control unit 16 then sets the lower limit voltage $V_{ll}$ based on the calculated temperature correction value $T_{filt}$ (step S18). After step S18, the process is ended.

According to the first embodiment, the temperature correction unit 18 calculates the temperature correction value by correcting the water temperature T, and the lower limit voltage control unit 16 controls the lower limit voltage of the fuel cell 20 based on the temperature correction value. At this time, the temperature correction unit 18 sets the time constant when the water temperature T is less than T2 to be greater than the time constant τ when the water temperature T is equal to or greater than T3.

More specifically, when the water temperature T is equal to or greater than T1 and less than T3, the temperature correction unit 18 sets the time constant τ to τ1 of FIG. 2B. Accordingly, the rate of change in the temperature correction value $T_{filt}$ is small, and the rate of change in the lower limit voltage $V_{ll}$ is also small. Therefore, the rise of the power generation voltage is reduced, and the decrease in the output current of the filet cell 20 is reduced. As a result, a good output response can be obtained. For example, even when the water temperature T temporarily rises as illustrated between t2 and t4 of FIG. 2C and FIG. 21), the rise of the lower limit voltage $V_{ll}$ is small, and thus the output response is good. That is to say, even when the temporal rise of the water temperature is detected before the cooling water cooled by the radiator 24 flows into the fuel cell 20, the excessive limitation of the output is prevented. This enables to obtain sufficient driving power when the driver presses on the accelerator.

Additionally, when the water temperature T is equal to or greater than T3, the temperature correction unit 18 sets the time constant τ to τ2 of FIG. 2B. Accordingly, the rate of change in the temperature correction value $T_{filt}$ is large, and the rate of change in the lower limit voltage $V_{ll}$ is also large. Therefore, as the water temperature rises, the lower limit voltage $V_{ll}$ rises, and the power generation voltage increases. The lower limit voltage $V_{ll}$ and the power generation voltage become, for example, $V_x$ as illustrated in FIG. 2D. Such a rise of the power generation voltage reduces the heat generation of the fuel cell 20, and thus prevents the evaporation of water in the fuel cell 20. Therefore, the degradation in power generation performance of the fuel cell 20 is reduced.

The temperature sensor 50 is located further upstream than the radiator 24. Accordingly, the water temperature T detected by the temperature sensor 50 is a temperature before the cooling water is cooled by the radiator 24, and directly reflects the state of the heat generation of the fuel cell 20. For example, immediately after the WOT operation is started, the water temperature T may rapidly increase due to the heat generation of the fuel cell 20. It takes a certain amount of time for cooling water cooled by the radiator 24 to reach the temperature sensor 50. Thus, the temperature sensor 50 detects the rise of the water temperature T. When the time constant τ is small and the water temperature T rapidly rises, the temperature correction value $T_{filt}$ also rapidly increases. Thus, the lower limit voltage $V_{ll}$ rises like that of the comparative example of FIG. 2I), the power generation voltage rises, and the output current decreases. According to the first embodiment, the temperature correction unit 18 sets the time constant τ to be large till the water temperature T reaches T3 even when the water temperature T rises, thereby reducing the rate of rise of the lower limit voltage $V_{ll}$. Accordingly, the rise of the power generation voltage is reduced. Therefore, the decrease in output voltage is reduced, and an excellent response can be obtained immediately after the operation is started.

The temperature sensor 50 may be located in any position of the coolant exhaust conduit 40, and is preferably located especially near the outlet of the cooling water of the fuel cell 20. This is because the temperature of the cooling water immediately after the cooling water is used for cooling can be detected. Instead of the radiator 24, a heat exchanger such as a radiator may be provided. $T_{filt\_1}$, T1, T2, and T3 may be values other than the above described values.

Although some embodiments of the present invention have been described in detail, the present invention is not limited to the specific embodiments but may be varied or changed within the scope of the present invention as claimed.

What is claimed is:

1. A fuel cell system comprising:
a fuel cell;
a coolant path connected to the fuel cell and allowing a coolant that cools the fuel cell to flow therethrough;
a temperature detection unit configured to detect a temperature of the coolant in the coolant path;
a temperature correction unit configured to calculate a temperature correction value for correcting the temperature of the coolant detected by the temperature detection unit; and
a lower limit voltage control unit configured to control a lower limit voltage of the fuel cell based on the temperature correction value, wherein
the temperature correction unit calculates the temperature correction value based on a following equation:

$$T_{filt} = T_{filt\_old} + \frac{T - T_{filt\_old}}{\tau}$$

where $T_{filt}$ represents the temperature correction value, $T_{filt\_old}$ represents a last temperature correction value, T represents the temperature of the coolant, and τ represents a coefficient, and
the coefficient when the temperature of the coolant is less than a first predetermined value is set to be greater than the coefficient when the temperature of the coolant is equal to or greater than a second predetermined value.

* * * * *